US010551474B2

(12) United States Patent
Bar David et al.

(10) Patent No.: US 10,551,474 B2
(45) Date of Patent: Feb. 4, 2020

(54) DELAY COMPENSATION WHILE CONTROLLING A REMOTE SENSOR

(71) Applicant: ISRAEL AEROSPACE INDUSTRIES LTD., Lod (IL)

(72) Inventors: Sagiv Bar David, Petah Tikva (IL); Yossi Cohen, Holon (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 531 days.

(21) Appl. No.: 14/761,529

(22) PCT Filed: Jan. 14, 2014

(86) PCT No.: PCT/IL2014/050045
§ 371 (c)(1),
(2) Date: Jul. 16, 2015

(87) PCT Pub. No.: WO2014/111931
PCT Pub. Date: Jul. 24, 2014

(65) Prior Publication Data
US 2015/0378000 A1    Dec. 31, 2015

(30) Foreign Application Priority Data

Jan. 17, 2013   (IL) .......................................... 224273

(51) Int. Cl.
*G01S 3/786* (2006.01)
*G06K 9/32* (2006.01)
*H04N 5/232* (2006.01)

(52) U.S. Cl.
CPC .............. *G01S 3/7864* (2013.01); *G06K 9/32* (2013.01); *H04N 5/232* (2013.01); *H04N 5/23203* (2013.01); *H04N 5/23216* (2013.01)

(58) Field of Classification Search
CPC .............. G01S 3/7864; H04N 5/23216; H04N 5/23203; H04N 5/232; G06K 9/32
(Continued)

(56) References Cited

U.S. PATENT DOCUMENTS 4,162,775 A    7/1979 Voles
4,405,940 A    9/1983 Woolfson et al.
(Continued)

FOREIGN PATENT DOCUMENTS

EP    0606173    7/1994
EP    0423984    6/1996
(Continued)

OTHER PUBLICATIONS

Mitra P. and G. Niemeyer "Mediating Time Delayed Teleoperation with User Suggested Models: Implications and Comparative Study" Symposium on Haptic Interfaces for Virtual Environments and Teleoperator Systems 2008 IEEE, Mar. 13-14, Reno, Nevada, USA (Year: 2008).*

(Continued)

*Primary Examiner* — Richard A Hansell, Jr.
(74) *Attorney, Agent, or Firm* — Dorsey & Whitney LLP

(57) ABSTRACT

The presently disclosed subject matter includes a method, a system and a delay compensation unit configured for compensating a delay in communication between a sensing unit and a control unit. A succession of two or more captured images are received from the sensing unit; information indicative of command dynamics parameters are obtained from the control unit; based on the information and a respective transfer function which models the dynamics of the sensor module, the expected reaction of the sensor module to the command is determined; and information indicative of the reaction before the command is executed in the sensing unit can be provided.

18 Claims, 8 Drawing Sheets

(58) Field of Classification Search
USPC .......................................................... 348/169
See application file for complete search history.

(56) References Cited

U.S. PATENT DOCUMENTS

| | | | |
|---|---|---|---|
| 4,405,943 A | 9/1983 | Kanaly | |
| 4,409,661 A | 10/1983 | Romanski | |
| 4,537,370 A | 8/1985 | Pizzurro | |
| 4,661,849 A | 4/1987 | Hinman | |
| 4,682,225 A | 7/1987 | Graham | |
| 4,710,813 A | 12/1987 | Wallis et al. | |
| 4,739,401 A | 4/1988 | Sacks et al. | |
| 4,805,018 A | 2/1989 | Nishimura et al. | |
| 4,843,568 A | 6/1989 | Krueger et al. | |
| 4,855,822 A | 8/1989 | Narendra et al. | |
| 4,868,871 A | 9/1989 | Watson, III | |
| H741 H | 2/1990 | Powell et al. | |
| 4,898,341 A | 2/1990 | Terzian | |
| 4,925,274 A | 5/1990 | James et al. | |
| 4,959,714 A | 9/1990 | Lo et al. | |
| 4,975,960 A | 12/1990 | Petajan | |
| 4,996,592 A | 2/1991 | Yoshida | |
| 5,036,474 A | 7/1991 | Bhanu et al. | |
| 5,062,056 A | 10/1991 | Lo et al. | |
| 5,103,484 A | 4/1992 | Stafford et al. | |
| 5,119,190 A | 6/1992 | Lemelson | |
| 5,149,980 A | 9/1992 | Ertel et al. | |
| 5,155,683 A | 10/1992 | Rahim | |
| 5,216,408 A | 6/1993 | Shirakawa | |
| 5,266,875 A * | 11/1993 | Slotine | B25J 9/1689 318/568.1 |
| 5,275,354 A | 1/1994 | Minor et al. | |
| 5,280,530 A | 1/1994 | Trew et al. | |
| 5,317,319 A | 5/1994 | Fagarasan et al. | |
| 5,323,470 A | 6/1994 | Kara et al. | |
| 5,340,309 A | 8/1994 | Robertson | |
| 5,341,143 A | 8/1994 | Reis et al. | |
| 5,355,325 A | 10/1994 | Uhlmann | |
| 5,365,236 A | 11/1994 | Fagarasan et al. | |
| 5,371,536 A | 12/1994 | Yamaguchi | |
| 5,390,133 A | 2/1995 | Sohie | |
| 5,392,225 A | 2/1995 | Ward | |
| 5,406,328 A | 4/1995 | Chodos et al. | |
| 5,422,829 A | 6/1995 | Pollock | |
| 5,424,823 A | 6/1995 | Nettles et al. | |
| 5,434,617 A | 7/1995 | Bianchi | |
| 5,450,503 A | 9/1995 | Ogino et al. | |
| 5,489,099 A | 2/1996 | Rankin et al. | |
| 5,557,685 A | 9/1996 | Schlossers et al. | |
| 5,564,650 A | 10/1996 | Tucker et al. | |
| 5,574,498 A | 11/1996 | Sakamoto et al. | |
| 5,602,760 A | 2/1997 | Chacon et al. | |
| 5,626,311 A | 5/1997 | Smith et al. | |
| 5,647,015 A | 7/1997 | Choate et al. | |
| 5,714,999 A | 2/1998 | Jeong et al. | |
| 5,761,326 A | 6/1998 | Brady et al. | |
| 5,785,275 A | 7/1998 | Hiebl | |
| 5,870,486 A | 2/1999 | Choate et al. | |
| 5,940,830 A | 8/1999 | Ochitani | |
| 5,949,481 A | 9/1999 | Sekine et al. | |
| 5,990,822 A | 11/1999 | Honigsbaum | |
| 6,044,166 A | 3/2000 | Bassman et al. | |
| 6,061,055 A | 5/2000 | Marks | |
| 6,064,332 A | 5/2000 | Cloutier | |
| 6,079,862 A | 6/2000 | Kawashima et al. | |
| 6,088,060 A | 7/2000 | Suda et al. | |
| 6,122,405 A | 9/2000 | Khani | |
| 6,154,559 A | 11/2000 | Beardsley | |
| 6,199,471 B1 | 3/2001 | Perruzzi et al. | |
| 6,208,758 B1 | 3/2001 | Ono et al. | |
| H1980 H | 8/2001 | Cloutier | |
| 6,271,752 B1 | 8/2001 | Vaios | |
| 6,272,484 B1 | 8/2001 | Martin et al. | |
| 6,404,937 B1 | 6/2002 | Agata et al. | |
| 6,445,832 B1 | 9/2002 | Lee et al. | |
| 6,449,019 B1 | 9/2002 | Fincher et al. | |
| 6,507,366 B1 | 1/2003 | Lee | |
| 6,515,689 B1 | 2/2003 | Terashima | |
| 6,624,846 B1 | 9/2003 | Lassiter | |
| 6,672,535 B2 | 1/2004 | Brunner, Jr. et al. | |
| 6,681,061 B2 | 1/2004 | Agata et al. | |
| 6,724,915 B1 | 4/2004 | Toklu et al. | |
| 6,728,404 B1 | 4/2004 | Ono et al. | |
| 6,757,328 B1 | 6/2004 | Huang et al. | |
| 6,778,171 B1 | 8/2004 | Kikinis | |
| 6,822,676 B1 | 11/2004 | Kurosawa et al. | |
| 6,840,627 B2 | 1/2005 | Olbrich | |
| 7,184,574 B1 * | 2/2007 | Zahavi | G01S 3/7864 348/169 |
| 7,312,766 B1 | 12/2007 | Edwards | |
| 7,335,026 B2 * | 2/2008 | Goree | F41A 17/06 434/22 |
| 7,362,352 B2 | 4/2008 | Ueyama | |
| 7,454,067 B1 | 11/2008 | Pati | |
| 7,620,483 B2 | 11/2009 | Florentin et al. | |
| 7,643,064 B1 | 1/2010 | Jouppi | |
| 7,761,173 B2 | 7/2010 | Ehrlich | |
| 7,860,276 B2 | 12/2010 | Anai et al. | |
| 8,229,163 B2 * | 7/2012 | Coleman | G06K 9/00208 382/103 |
| 2002/0030741 A1 | 3/2002 | Broemmelsiek | |
| 2002/0037770 A1 | 3/2002 | Paul et al. | |
| 2002/0054211 A1 | 5/2002 | Edelson et al. | |
| 2002/0080159 A1 | 6/2002 | Montgomery et al. | |
| 2002/0140813 A1 | 10/2002 | Trajkovic et al. | |
| 2002/0140814 A1 | 10/2002 | Cohen-Solal et al. | |
| 2002/0168091 A1 | 11/2002 | Trajkovic | |
| 2002/0180878 A1 | 12/2002 | Lida et al. | |
| 2002/0186221 A1 | 12/2002 | Bell | |
| 2003/0035051 A1 | 2/2003 | Cho et al. | |
| 2003/0051597 A1 | 3/2003 | O'Dwyer | |
| 2004/0156561 A1 | 8/2004 | Yu-Chuan et al. | |
| 2005/0004759 A1 | 1/2005 | Siegel | |
| 2005/0077469 A1 | 4/2005 | Kaushal | |
| 2005/0119801 A1 | 6/2005 | Florentin et al. | |
| 2006/0058929 A1 * | 3/2006 | Fossen | B63B 9/001 701/21 |
| 2006/0227862 A1 | 10/2006 | Campbell et al. | |
| 2006/0262365 A1 | 11/2006 | Imao | |
| 2007/0197229 A1 | 8/2007 | Kalliola et al. | |
| 2007/0230576 A1 * | 10/2007 | Heller | H04N 19/51 375/240.16 |
| 2008/0252722 A1 | 10/2008 | Wang et al. | |
| 2008/0267451 A1 * | 10/2008 | Karazi | G01S 5/16 382/103 |
| 2009/0048748 A1 * | 2/2009 | Zhao | B60W 10/04 701/59 |
| 2009/0129631 A1 | 5/2009 | Faure et al. | |
| 2009/0282916 A1 * | 11/2009 | Modugno | G01C 19/5776 73/504.12 |
| 2010/0149332 A1 | 6/2010 | Wang | |
| 2011/0026774 A1 * | 2/2011 | Flohr | G08C 17/02 382/106 |
| 2011/0130114 A1 | 6/2011 | Boudville | |
| 2011/0261202 A1 * | 10/2011 | Goldstein | G08B 13/19602 348/149 |
| 2011/0301925 A1 * | 12/2011 | McWilliams, III | G09B 9/08 703/6 |
| 2011/0310219 A1 | 12/2011 | Kim et al. | |
| 2012/0019660 A1 | 1/2012 | Golan et al. | |
| 2012/0062732 A1 | 3/2012 | Marman et al. | |
| 2013/0021475 A1 * | 1/2013 | Canant | H04N 5/33 348/144 |
| 2013/0342750 A1 * | 12/2013 | Foote | H04N 5/23212 348/349 |
| 2014/0226024 A1 * | 8/2014 | Limbaugh | H04N 5/23203 348/169 |
| 2015/0110345 A1 | 4/2015 | Weichselbaum | |

(56) References Cited

U.S. PATENT DOCUMENTS

| | | | | |
|---|---|---|---|---|
| 2015/0293877 | A1* | 10/2015 | Liang | A61B 1/00016 710/33 |
| 2017/0061813 | A1* | 3/2017 | Tao | G09B 9/08 |

FOREIGN PATENT DOCUMENTS

| | | |
|---|---|---|
| EP | 2117225 | 5/2012 |
| EP | 2757771 | 7/2014 |
| IL | 147370 | 7/2007 |
| IL | 134206 | 8/2007 |
| IL | 169345 | 2/2015 |
| IL | 169346 | 5/2015 |
| IL | 169347 | 6/2015 |
| WO | WO1999/60335 | 11/1999 |
| WO | WO2000/46985 | 8/2000 |
| WO | WO2010081190 | 7/2010 |
| WO | 2012/010887 | 1/2012 |
| WO | WO 2014066869 A1 * | 5/2014 ......... A61B 1/00016 |
| WO | WO-2014066869 A1 * | 5/2014 |

OTHER PUBLICATIONS

Mitra P. and G. Niemeyer "Model-Mediated Telemanipulation", The International Journal of Robotics Research, vol. 27, No. 2, Feb. 2008, pp. 253-262 (Year: 2008).*

Sheridan T.B. "Space Teleoperation Through Time Delay: Review and Prognosis", IEEE Transactions on Robotics and Automation, vol. 9, No. 5, Oct. 1993 (Year: 1993).*

Franken M. etal. "Bilateral Telemanipulation With Time Delays: A Two-Layer Approach Combining Passivity and Transparency", IEEE Transactions on Robotics, vol. 27, No. 4, Aug. 2011 (Year: 2011).*

Nummiaro et al., "An adaptive color-based particle filter." Image and Vision Computing (2002) pp. 1-12.

* cited by examiner

DELAY COMPENSATION WHILE CONTROLLING A REMOTE SENSOR

FIELD OF THE PRESENTLY DISCLOSED SUBJECT MATTER

The presently disclosed subject matter relates to the remote operation of a sensing device in the presence of a communication delay.

BACKGROUND

In many applications, an operator of a system for surveillance and remote tracking of objects controls a remote image sensor via a communication link. Examples are traffic control, border control, search and rescue operations, land surveys, police surveillance, military applications, etc.

In general, a system for surveillance and remote tracking of objects comprises a control unit at one end and a remote sensing unit at the other end which communicate over a communication link. The sensing unit, with the help of an image sensor, can be used for surveying a scene including one or more objects, and transmitting sensing-data, which includes data that was acquired by the sensing unit or data generated by the sensing unit in relation to the acquired data (e.g. captured images, object-data characterizing identified objects etc.) to a control unit. In the control unit the images can be displayed on a display for viewing by an operator. Furthermore, the sensing unit can be configured to lock and track a sighted object. The control unit provides to the sensing unit control data, including for example, different types of commands, such as track commands, zoom commands, centering commands, etc. and the commands can be executed by the sensing unit.

According to one possible scenario, in case an operator of the control unit decides that it is desirable to track an object in the surveyed scene, he initiates a sequence of operations directed for this purpose. The operator can first send commands (including pointing instructions being a type of control data) to the sensing unit which identifies the object that should be tracked. The pointing instructions are coarse pointing instructions which are generated manually by the operator and include for example, "move up", "move right", "zoom" or similar commands. In response, the sensing unit acts upon these instructions, and directs the image sensor towards the required area.

The operator can send additional control data including for example a lock and track command (including locking instructions) directing a sensing unit to lock onto a selected object in the scene. In response, the sensing unit receives the instructions and attempts to lock onto the object indicated in the command.

Once the object has been locked, the sensing unit begins to operate in response to tracking instructions, which are generated within the sensing unit and are directed for tracking the locked object. The tracking instructions are forwarded to the image sensor which in turn tracks the moving object and keeps the object in the center of field of view (FOV) of the display, even while the object moves relative to the sensing unit.

In many applications, there is a time-delay between the time when the sensing unit acquires an image of an object, to when the image is displayed on the display located at the control unit, and further to the time the corresponding instructions are received at the sensing unit. Factors that can contribute to such a delay include for example, signal processing, image compression/decompression, duration of the communication, and/or link bandwidth limitations. Consequently, when taking into account the delayed reaction time of the operator, the accumulated delayed time can be from fractions of a second to several seconds.

Humans do not function well in feedback loops with time-delay, and their reactions and directions are less precise than, for example, computer or processor generated instructions. When a human operator inputs the commands, the process can become complicated. Assuming for the sake of example, an operator issued a command instructing the sensing unit to move the center of FOV by a few degrees to the north. Due to the time delay between the time the command is issued at the control unit to the time it is executed by the sensor, the operator may not see an immediate reaction on the display at the control unit. As a result, the operator cannot know in real-time the actual effect of his command and whether the issued command is sufficient for moving the center of the FOV to the desired location.

As a result, the operator may mistakenly think that the first command was insufficient, and may repeat and issue another command to move the center of FOV to the north. By the time both the first and second commands are executed, the image sensor is directed too far to the north. The operator is then likely to issue another command in attempt to rectify and direct the image sensor towards the desired location (now back towards the south). As before, the operator may not see an immediate reaction to the rectifying command, which may lead to additional commands attempting to more accurately place the center of FOV in the desired location.

In addition to the above, due to this time-delay, the location of the object as displayed on the display at the control unit is generally not the current location of the object. The location displayed on the display is the location of the object before the transfer of the sensing-data from the sensing unit to the control unit (e.g. x seconds ago). Additionally, by the time the sensing unit receives the control data from the control unit and generates the instruction for the image sensor, an additional time-delay occurs, (e.g. an additional y seconds). Consequently, by the time image sensor is instructed to locate an object, the object may no longer be in the same location as it was when the image picture was taken over x+y seconds ago. This may result from the motion of a mobile object, from the motion of the image sensor device, or from a combination of these two factors.

Clearly, this time-delay complicates the efforts to lock onto an object. The operator has to accurately calculate and estimate the expected location of the object at a time in the future when the instructions arrive/are received at the sensing unit. Only then is the sensing unit directed to the calculated estimated location, and a locking and tracking operation can be initiated.

If the calculation of the estimated location is not sufficiently accurate, the sensing unit will lock onto some other background object, and the entire estimate, calculate and lock process has to be repeated. As such, the effect is a continuous feedback control loop with delay, a situation which is liable to suffer from overshoots and instability.

Publications considered to be relevant as background to the presently disclosed subject matter are listed below. Acknowledgement of the publications herein is not to be inferred as meaning that these are in any way relevant to the patentability of the presently disclosed subject matter. U.S. Pat. No. 7,184,574 discloses a tracking apparatus including a sensor tracker and a control tracker. The sensor tracker is connected to a sensor which senses a scene having at least one object therein; the sensor tracker provides sensor movement instructions to the sensor, enabling it to track a selected object. The control tracker is located remotely from and communicates with the sensor tracker. Additionally, the control tracker takes measurements regarding the selected object and provides tracking instructions to the sensor tracker. The sensor tracker then utilizes the tracking instructions to adjust the sensor movement instructions, when necessary. US Patent Publication No. 2008267451 discloses a method for tracking an object that is embedded within images of a scene, including: in a sensor module that includes a movable sensor, generating, storing and transmitting over a communication link a succession of images of a scene. In a remote control unit, the succession of images is received. Also disclosed is receiving a user command for selecting an object of interest in a given image of the received succession of images and determining object-data associated with the object and transmitting through the link to the sensor module the object-data. In the sensor module, the given image of the stored succession of images and the object of interest using the object-data are identified, and the object in the other image of the stored succession of images is tracked. The other image is later than the given image. In case the object cannot be located in the latest image of the stored succession of images, information of images in which the object was located are used to predict estimated real-time location of the object, and direction command is generated to the movable sensor for generating real-time image of the scene and locking on the object.

EP Patent No. 0423984 discloses a synergistic tracker system which includes both a correlation tracker and an object tracker for processing sensing-data input and for generating tracking error signals. The operation of the synergistic tracker system is controlled by a central processing unit. The system operates by first correlating a reference region image with a portion of a current digitized image provided by an analog to digital converter. Secondly, the object tracker provides a precisely defined track point for an object within the current image. The correlation tracker stabilizes and limits the portion of the digitized image that the object tracker must operate upon. Stabilizing and limiting this portion of the digitized image reduces the object tracker's sensitivity to background clutter and sensitivity to a loss of lock induced by sensor motion. The object tracker provides a non-recursive update for the correlation's reference region image. The correlation tracker and the object tracker are used simultaneously and cooperatively so that the strengths of one tracker are used to overcome the weaknesses of the other. The invention disclosed in EP0423984 provides a greater tracking tenacity, a reduction in tracker angle noise, and a reduction in hardware complexity.

U.S. Pat. No. 7,620,483 relates to a method for guiding from a remote control unit a vehicle towards a target object, said remote control unit communicating with the vehicle by means of a lagged communication channel, comprising:

At the vehicle: (a) Periodically capturing frame images by a camera, assigning to each of said captured frames an associated unique time stamp, and saving within a storage at the vehicle full frame data or partial frame data of captured frames and their associated time stamps; (b) For a plurality of saved frames, sending to the control unit via the lagged communication channel full frame data, partial frame data or a combination thereof with the corresponding associated time stamp for each sent frame so that an approximate or exact version of the sent frames can be reconstructed and displayed at the control unit;

At the control unit: (c) Receiving said frame data and associated time stamps, sequentially reconstructing frame images from each said sent full and/or partial frame data, and displaying the reconstructed images on a display; (d) Upon marking by an operator at the control unit a point on a specific displayed frame, sending coordinates indication relating to said marked point as appearing on said specific frame or on a reference frame available at the control unit, and the time stamp associated with said specific or reference frame, as is the case, to the vehicle;

At the vehicle: (e) Receiving said coordinates indication as marked and the sent frame time stamp; (f) Given the coordinates indication and frame time stamp as received, fast forward tracking said point or object coordinates from the said frame towards the most recently available captured frame, thereby finding the coordinates of the same point or object as appearing in the most recently available captured frame; and (g) Providing the coordinates of the target point or object within the most recently available captured frame, as found, to an inner guidance sub-system of the vehicle, for enabling it to track said object.

General Description

According to an aspect of the presently disclosed subject matter there is provided a delay compensation unit: the delay compensation unit is operatively connectable to a sensing unit and a control unit; the sensing unit comprises a sensor module and is configured to communicate over a communication link with a control unit, to capture two or more images of a scene, to generate a succession of images and transmit the succession of images to the control unit; wherein communication between the control unit and the delay compensation unit is faster than communication between the control unit and the sensing unit; the delay compensation unit is configured, responsive to a command issued in the control unit with respect to the succession of images, to: obtain from the control unit information indicative of command dynamics parameters; determine, based on the information and a respective transfer function which models the dynamics of the sensor module, the expected reaction of the sensor module to the command; and provide to the control unit information indicative of the reaction before the command is executed in the sensing unit.

The delay compensation unit disclosed herein, where the data indicative of the command dynamics parameters include data indicative of the angular velocity of a respective command operation.

The delay compensation unit disclosed herein, where said command is a sensor-movement command, directed for pointing the sensor in a desired direction; the delay compensation unit is configured to: determine, based on the information indicative of the command dynamics parameters and the respective transfer function, the future location of the center of field of view (FOV) following execution of the command; and provide an indication to the control unit indicating the future location of the center of FOV before the command is executed in the sensing unit.

The delay compensation unit disclosed herein, where the command is a lock command, directed for locking the sensor on a selected object of interest in the scene, the delay compensation unit being configured to: in case said object of interest is moving, to determine future location of said object at the time the command is executed in said sensing unit; to modify the lock command to include the future location; and transmit the modified lock command to the sensing unit, thereby providing the sensing unit with information indicative of predicted real-time location of the selected object.

The delay compensation unit disclosed herein, where the command is a zoom command; the delay compensation unit is configured to: determine based on the data indicative the command dynamics parameters to and the respective transfer function, the effect of the zoom command on the captured images; generate a digital simulation of the effect of the zoom command; and provide the control unit with the digital simulation before the command is executed in the sensing unit.

The delay compensation unit disclosed herein, where the information indicative of the command dynamics parameters includes information with respect to a zoom direction and zoom extent. The delay compensation unit disclosed herein, where the command is a focus command; the delay compensation unit is configured to: generate based on the information indicative of the command dynamics parameters, obtained from one or more initial focus commands, and the respective transfer function, a focus curve indicative of the optimal focus of the sensor; provide the control unit with data indicative of said focus curve; indicate a position of a current focus with respect to the focus curve before the focus command is executed in the sensing unit, thereby providing the control unit with information indicative of the optimal focus.

The delay compensation unit disclosed herein, where the information indicative of the command dynamics parameters includes information with respect to a focus direction and focus extent. The delay compensation unit disclosed herein is configured to execute said command with respect to the selected object notwithstanding a time-delay between a time when the sensing unit acquires the image with the selected object, to a time when a corresponding command is received at the sensing unit with respect to the selected object.

According to another aspect of the presently disclosed subject matter there is provided an electro optic system, comprising: a sensing unit comprising a sensor module, the sensing unit configured to communicate over a communication link with a control unit, to capture two or more images of a scene and to generate a succession of images and transmit the succession of images to the control unit; a delay compensation unit operatively connected to the sensing unit and the control unit, wherein communication between the control unit and the delay compensation unit is faster than communication between the control unit and the sensing unit; the delay compensation unit is configured, responsive to a command issued in the control unit with respect to the succession of images, to: obtain from the control unit information indicative of command dynamics parameters; determine, based on the information and a respective transfer function which models the dynamics of the sensor module, the expected reaction of the sensor module to the command; and provide to the control unit information indicative of the reaction before the command is executed in the sensing unit.

The system disclosed herein, where the command is a lock command, directed for locking the sensor on a selected object of interest in the scene, the delay compensation unit is configured to: in case said object of interest is moving, to determine future location of said object at the time the command is executed in said sensing unit; to modify the lock command to include the future location; and transmit the modified lock command to the sensing unit thereby providing the sensing unit with information indicative of predicted real-time location of the selected object. The system disclosed herein, where said sensing unit is configured, responsive to a lock command received from delay compensation unit: to search for moving objects in a predefined area surrounding the predicted real-time location of the selected object in order to ensure that the correct moving object is selected.

According to yet another aspect of the presently disclosed subject matter there is provided a method comprising a delay compensation unit being operatively connectible to a sensing unit and a control unit, wherein communication between the control unit and the delay compensation unit is faster than communication between the control unit and the sensing unit; receiving from said sensing a succession of two or more captured images; obtaining from the control unit information indicative of command dynamics parameters; determining based on the information and a respective transfer function which models the dynamics of the sensor module, the expected reaction of the sensor module to the command; and providing to the control unit information indicative of the reaction before the command is executed in the sensing unit.

According to yet another aspect of the presently disclosed subject matter, there is provided a non-transitory computer storage device readable by machine, tangibly embodying a program of instructions executable by the machine to perform a method of compensating a delay in communication between a sensing unit and a control unit, the method comprising:

receiving from said sensing unit a succession of two or more captured images; obtaining from the control unit information indicative of command dynamics parameters; determining, based on the information and a respective transfer function which models the dynamics of the sensor module, the expected reaction of the sensor module to the command; and providing to the control unit information indicative of the reaction before the command is executed in the sensing unit.

It is noted that any feature mentioned above with respect to one of the aspects may be similarly applicable, mutatis mutandis, to the other aspects.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

Figure 1:
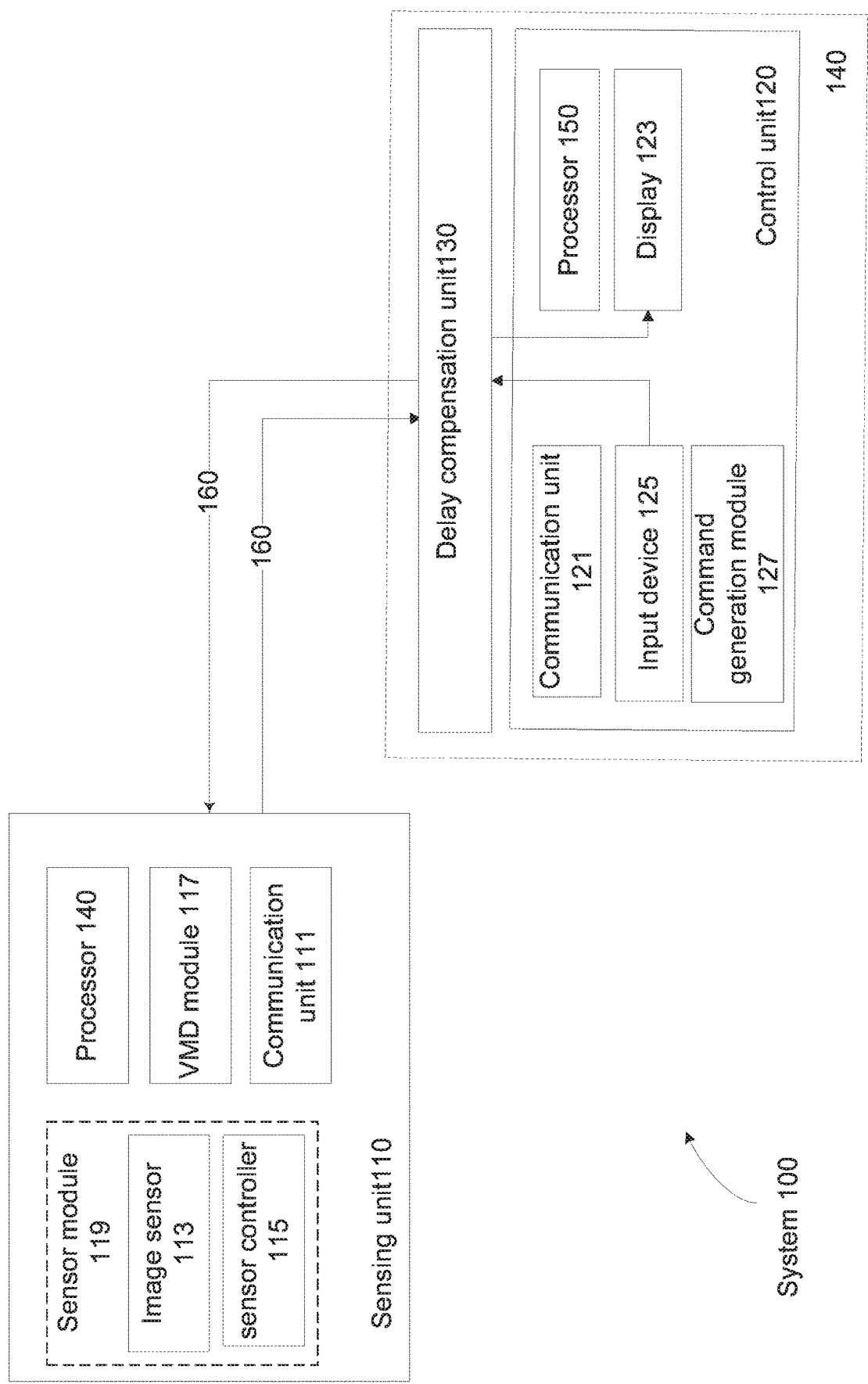
FIG. 1 is a functional block diagram schematically illustrating an electro optic system, in accordance with the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "receiving", "obtaining", "determining", "providing", or the like, include actions and/or processes of a computer that manipulate and/or transform data into other data, said data represented as physical quantities, e.g. such as electronic quantities, and/or said data representing the physical objects.

The electro optic observation system disclosed herein comprises or is otherwise associated with at least one computer. The term "computer" should be expansively construed to cover any kind of electronic device with data processing capabilities, including, by way of non-limiting example, a personal computer, a server, a computing system, a communication device, a processor (e.g. digital signal processor (DSP), a microcontroller, a field programmable gate array (FPGA), an application specific integrated circuit (ASIC), etc.), any other electronic computing device with suitable processing capabilities, and or any combination thereof.

The operations in accordance with the teachings herein may be performed by a computer specially constructed for the desired purposes or by a general purpose computer specially configured for the desired purpose by a computer program stored in a computer readable storage medium.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 2:
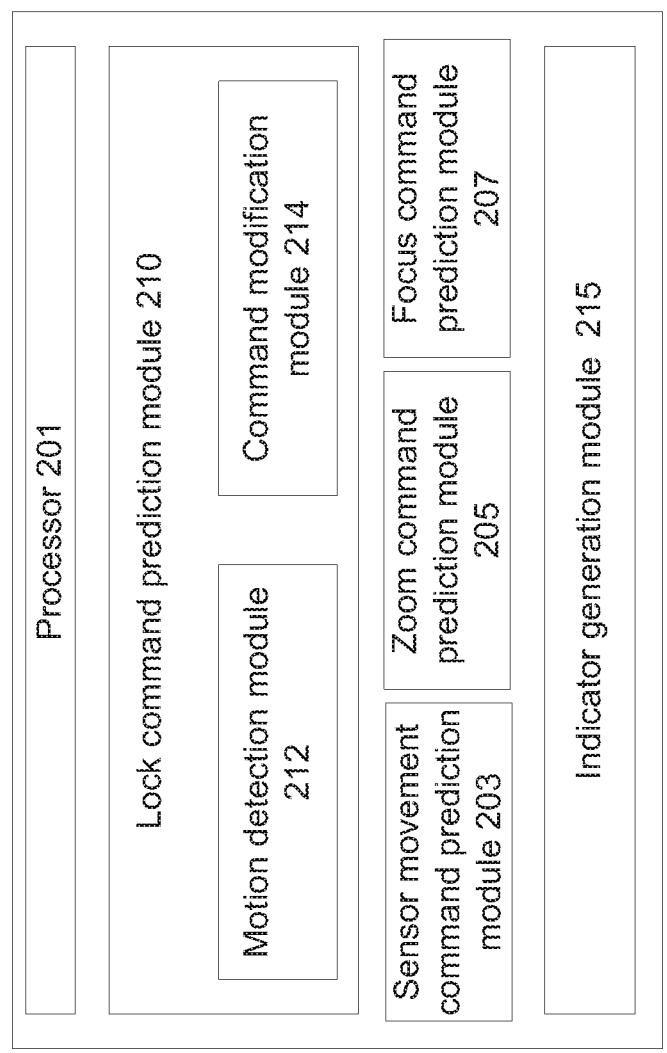
FIG. 2 is another functional block diagram schematically illustrating a delay compensation unit, in accordance with the presently disclosed subject matter.

In embodiments of the presently disclosed subject matter, fewer, more and/or different stages than those shown in FIGS. 3 to 7 may be executed. In embodiments of the presently disclosed subject matter, one or more stages illustrated in FIGS. 3 to 7 may be executed in a different order and/or one or more groups of stages may be executed simultaneously. FIGS. 1 and 2 illustrate a general schematic of the system architecture in accordance with an embodiment of the presently disclosed subject matter. Functional elements in (modules) in FIGS. 1 and 2 can be made up of a combination of software and hardware and/or firmware that performs the functions as defined and explained herein. Functional elements (e.g. modules) in FIGS. 1 and 2 can comprise at least one respective computer processor and/or computer memory or can be a part of a computer processor or of a computer memory, the computer processor and the memory being configured for executing instructions for performing the respective functions. Functional elements (modules) in FIGS. 1 and 2 may be centralized in one location or dispersed over more than one location. In other embodiments of the presently disclosed subject matter, the system may comprise fewer, more, and/or different modules than those shown in FIGS. 1 and 2.

Bearing the above in mind, attention is now drawn to FIG. 1 showing a functional block diagram schematically illustrating an electro optic (EO) observation system, in accordance with the presently disclosed subject matter. FIG. 1 shows an electro optic observation system 100 comprising a sensing unit 110 and control unit 120 communicating over a communication link 160. Sensing unit 110 and control unit 120 can be located remotely from each other. For example, control unit 120 can be located on the ground while sensing unit 110 is located onboard any one of the following: an Unmanned Aerial Vehicle, an Unmanned Ground Vehicle, missile, a satellite, another remote location on the ground etc. Communication between sensing unit 110 and control unit 120 can be facilitated for example, with the help of communication module 111, located in sensing unit 110 and communication module 121 located at the control unit 120. EO observation system 100 further comprises delay compensation unit 130 communicating with both sensing unit 110 and control unit 120. Delay compensation unit 130 can be configured as part of control unit 120 or otherwise configured as a separate unit operatively connectable to control unit 120 (for example it can be incorporated together with control unit 120 in the same control station 140). The delay in communication transmission between control unit 120 and delay compensation unit 130 is negligible relative to the total delay between control unit 120 and sensing unit 110.

According to the teaching disclosed herein, sensing unit 110 comprises at least one image sensor 113, a sensor controller 115 and processor 140. FIG. 1 illustrates a sensor module 119 comprising image sensor 113 and sensor controller 115. Image sensor 113 can be any device configured to acquire information with respect to a surveyed scene and generate respective images. Image sensor 113 includes for example an image sensing device such as a camera, radar (e.g. Synthetic Aperture Radar), sonar, laser, etc. A succession of captured images is generated in sensing unit 110 and transmitted via communication module 111 to control unit 120 via delay compensation unit 130. Sensor controller 115 is configured to control sensor 113 in response to instructions generated based on received commands. Sensor controller 115 also includes the functionalities of a servo controller configured for physically adjusting the positioning of the sensor (e.g. by controlling a gimbal mechanism).

As explained in more detail below, sensing unit can further comprise a VMD module 117 configured for implementing a VMD (Video Motion Detection) algorithm on the succession of images for identifying moving objects therein.

Images generated by sensing unit are received in control unit 120 and can be displayed on display screen 123 (e.g. LCD screen).

Different types of commands can be issued at control unit 120 directed for controlling the sensor module 119. Types of commands include for example, sensor-movement commands, lock commands, and commands directed for controlling other features of the sensor, such as zooming commands and focus commands.

A sensor-movement command is directed for pointing sensor 113 in a desired direction, for example in order to view a desired area. A lock command is directed for locking sensor 113 on a desired object in the monitored scene, and tracks the object in case the object is in motion. A zooming command is directed for adjusting the zoom of sensor 113 and a focus command is directed for adjusting the focus of sensor 113.

It is noted that the term "object" as used herein should be broadly interpreted to include any type of identifiable object or area in an image of a scene or part thereof, including a specific type of object in an image of a scene (e.g. car, building, person, aircraft, etc.) as well as a discernible group of one or more pixels (e.g. a group of moving pixels or a group of pixels characterized by a discernible temperature with respect to the surrounding area) or an area selected in an image of the scene.

Commands can be issued with the help of any type of input device (125) which includes for example, a joystick, a mouse, a touch pad, a keyboard or any other device enabling interaction with the display.

Delay compensation unit 130 is configured in general to receive information with respect to an issued command from control unit 120. As explained in more detail below, the received information characterizes the dynamics of the issued commands. Delay compensation unit 130 is further configured to determine, based on the received information, the expected reaction of the sensor module 119 to the respective issued command. Information indicative of the expected reaction of the sensor to the issued command is transmitted back from delay compensation unit 130 to control unit 120 and displayed on the display screen.

Unlike the actual execution of a command at sensing unit 110, determination of the expected reaction of the sensor to a command is performed immediately after the command is issued without a significant time-delay. Accordingly, delay compensation unit 130 provides the operator with feedback practically with no delay (or with insignificant delay) to issued commands, enabling smoother and more intuitive operation. Furthermore, delay compensation unit 130 enables to execute a lock command issued with respect to a selected moving object notwithstanding a time-delay between a time when the sensing unit acquires the image with the selected object, to a time when a corresponding command is received at the sensing unit with respect to the selected object.

FIG. 2 is a functional block diagram illustrating a delay compensation unit, in accordance with the presently disclosed subject matter. FIG. 2 is an example showing different functional elements operating within delay compensation unit 130.

Delay compensation unit 130 comprises one or more processors 201 configured for controlling and executing operations in response to respective instructions. Delay compensation unit 130 further comprises lock command prediction module 210 configured to predict, responsive to a lock command issued at control unit 120, the location of a target object, as it appears to the sensor at the time the command is executed at the sensing unit; sensor-movement command prediction module 203 is configured to predict the expected reaction of sensor module 119 to a specific command directed for pointing the sensor in a desired direction, which is issued at control unit 120; Zoom command prediction module 205 is configured to predict the expected reaction of sensor module 119 to a specific zoom command issued at control unit 120; and Focus command prediction module 207 is configured to predict the expected reaction of sensor module 119 to a specific focus command issued at control unit 120. The specific operations executed by each of these modules are described below in detail with reference to FIGS. 4-7. The functional modules mentioned above can comprise at least one respective computer processor and/or computer memory or can be a part of a computer processor or of a computer memory, the computer processor and the memory being configured for executing instructions for performing the respective functions.

Figure 3:
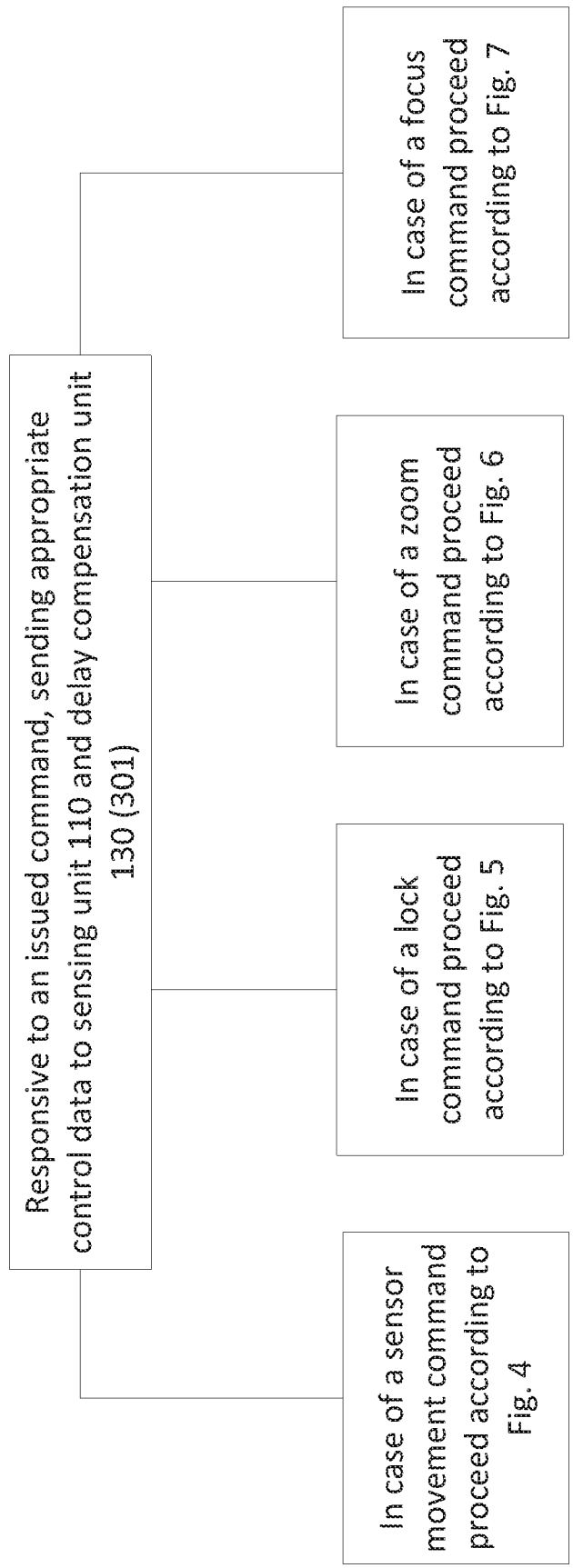
FIG. 3 is a flowchart illustrating operations at high-level performed by a sensing unit, in accordance with the presently disclosed subject matter.

FIG. 3 is a flowchart illustrating general operations performed by system 100 in response to a command, in accordance with the presently disclosed subject matter. Responsive to a command which is issued at control unit 120, control unit is configured to generate the appropriate control data required for the specific type of issued command (block 301).

For example, as explained below, in case a lock command or a sensor-movement command is issued, the control data of the command includes information indicative of the command dynamics parameters including for example, the angular velocity characterizing the command operation.

To this end control unit 120 can be configured (e.g. with the help of command generation module 127) to obtain the respective angular velocity of the issued command and incorporate information indicative of the angular velocity in the control data sent to delay compensation unit 130. Information indicative of the angular velocity of the issued command can be obtained for example from a controller operatively connected to the input device (e.g. joystick) which is used to issue the command.

In case a zoom command is issued, the control data of the command includes information indicative of parameters of the zoom-command dynamics including for example, the zoom direction (whether it is a zoom-in or zoom-out) and the extent of the zoom.

To this end, control unit 120 can be configured (e.g. with the help of command generation module 127) to obtain the respective information indicative of the zoom command, and incorporate this information into the control data sent to delay compensation unit 130.

In case a focus command is issued, the control data of the command includes information indicative of the parameters of the focus command dynamics including for example, the focus direction (whether it is a far-focus or near-focus), and the extent of the focus.

To this end, control unit 120 can be configured (e.g. with the help of command generation module 127) to obtain the respective information indicative of the focus command and incorporate this information in the control data sent to delay compensation unit 130.

The control data is transmitted to delay compensation unit 130. Delay compensation unit 130 is configured in turn to execute the appropriate process for processing the respective command. A sensor movement command can be handled for example with the help of sensor movement command module 203 in accordance with the operations described below with reference to FIG. 4; a lock command can be handled for example with the help of lock command module 210 in accordance with the operations described below with reference to FIGS. 5a and 5b; a zoom command can be handled for example with the help of zoom command module 205 in accordance with the operations described below with reference to FIG. 6; and a focus command can be handled for example with the help of focus command module 207 in accordance with the operations described below with reference to FIG. 7.

The actual reaction of the sensor module to a given command is also dependent on the time of the delay of communication between the control unit and the sensing unit. For example, for a given command to change the pointing direction of the sensor, the sensor would move faster in a smaller delay and slower in a greater delay. Accordingly, when determining the expected reaction of the sensor module to any (of any type including all the commands specified below) given command, the time delay between the sensing unit and control unit is also considered. To this end, the time delay is made available to delay compensation unit 130. In some cases the time-delay can be a substantially constant duration (with some acceptable variance) of time which can be provided as input data to delay compensation unit 130. In other cases, delay compensation unit 130 can be operable to calculate the time-delay. This can be accomplished for example by issuing a zoom command and measuring the time delay from the time the zoom command is issued to the time a change in the zoom is noticed in an image displayed at the control center. The measured time delay provides a good estimation of the time delay between the control center and sensing unit.

It is noted that while the presently disclosed subject matter describes in detail the operations related to the processing of a sensor moving command, a lock command, a zoom command and a focus command, this is done for the sake of example only and therefore should not be construed as limiting in any way. The principles disclosed herein (including providing the user with real time feedback of the system response to his commands), are similarly applicable for processing other types of commands as well.

Figure 4:
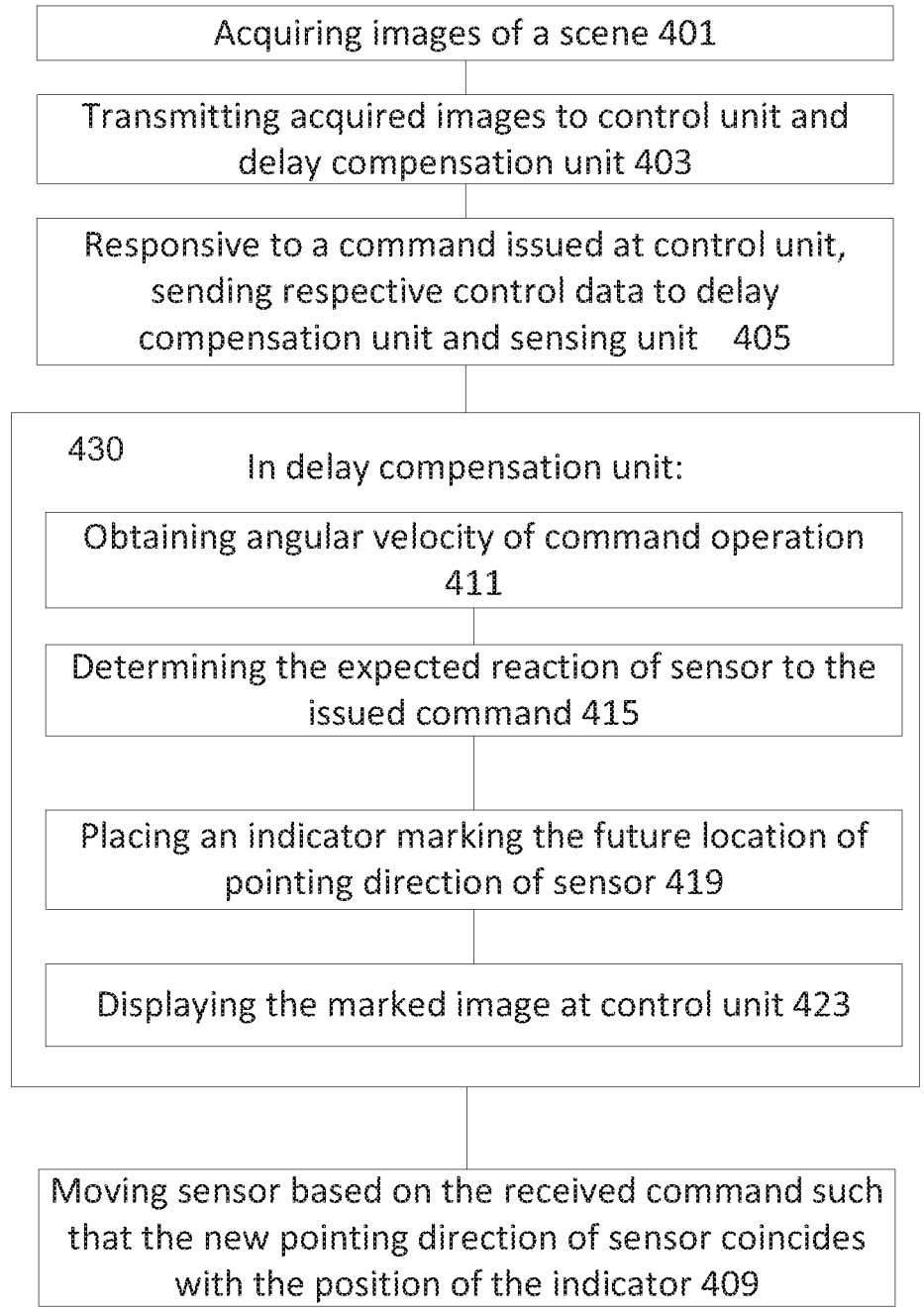
FIG. 4 is a flowchart illustrating operations performed responsive to a sensor movement command, in accordance with the presently disclosed subject matter.

Attention is now reverted to FIG. 4 which shows a flowchart illustrating operations performed responsive to a sensor movement command, in accordance with the presently disclosed subject matter. Operations described with reference to FIG. 4 can be executed, for example, with the help of EO observation system 100. More specifically, operations described with reference to FIG. 4 with respect to block 430 can be executed for example with the help of sensor movement command prediction module 203 in delay compensation unit 130.

Images of the surveyed scene are captured by a sensor (e.g. sensor 113) operating in the sensing unit (block 401). The captured images are transmitted, in a succession of images, from the sensing unit to the delay compensation unit and the control unit, where the images are displayed on a display screen (e.g. an LCD screen) (block 403). The images can be transmitted to control unit 120 via delay compensation unit 130.

Responsive to a sensor-movement command issued at the control unit, control data characterizing the issued command is sent to sensing unit 110 for execution and to delay compensation unit 130 (block 405). The control data can be sent to the sensing unit via the delay compensation unit.

The control data which is sent to delay compensation unit includes data indicative of the type of command which was issued. As mentioned above, the control data further includes information indicative of the dynamics of the command operation. In case of sensor-movement command, the dynamics of the command include the angular velocity characterizing the command operation. For example, in case a command to move the sensor by a few degrees to the left was issued by moving a joystick in a desired direction, the control data includes data indicative of the angular velocity of the joystick movement (e.g. in terms of degrees per second).

As known in the art, a sensor module 119 is characterized by a respective transfer function which models the dynamics of the sensor module and provides information with respect to the relation between the input provided to the sensor module 119 and the output generated by the sensor module 119 in response to this input. An expected reaction of a given sensor module 119 to a command, generated for controlling the sensor module 119, can be determined based on the transfer function of the sensor module 119 and certain characteristics of the command. Accordingly, knowing the angular velocity of the issued command, the expected reaction of the sensor module 119 to the command can be determined with the help of the respective transfer function.

Operations performed by delay compensation unit are described in FIG. 4 with reference to block 430. Data indicative of the angular velocity of the command operation is obtained from the control data of the received command (block 411). The transfer function of the respective sensor module 119 which is being used in the sensing unit for executing the issued command, is made available to the delay compensation unit (e.g. can be stored in a data repository in the delay compensation unit).

The expected reaction of the sensor module 119 to the issued command is determined with the help of the transfer function of the sensor module and is based on the angular velocity of the command operation (block 415). An indicator (e.g. cross indicator or tracking window indicator) is placed in the latest available image of the scene (e.g. most recently captured image which is available for processing in delay compensation unit 130), indicating the future location of a point in the image of the scene towards which the sensor will be pointing (which can be for example the center of field of view (FOV)) following execution of the received sensor-movement command (block 419).

To this end, delay compensation unit 130 can further comprise an indicator generation module 215 configured, based on the information obtained from module 203, to determine the correct location of the indicator in the image and add the indicator to the image.

The marked image is transmitted to the control unit where it is displayed on a display screen, thereby providing the operator with feedback indicative of the result of the issued command (block 423). The feedback is provided to the operator without delay (or with insignificant delay) and before the command is executed at the sensing unit. By simulating to an operator the predicted reaction of the image sensor, immediately after the command is issued the operator can determine whether the issued command provides the desired results and whether or not additional commands are required.

In the meantime, the command is received at the sensing unit where it is processed and executed by the sensor module 119 where the sensor is moved in accordance with the instructions generated based on the received command (block 409).

As mentioned above, the succession images which are generated in the sensing unit are sent to the delay compensation unit which is configured in turn to maintain a constant location of the indicator with respect to the scene along the images in the succession of images. When the sensor completes its movement, an image representing the desired pointing direction of the sensor (e.g. the center of FOV), is received. In this image, the location of the indicator coincides with the new desired pointing direction of the sensor resulting from movement of the sensor. In addition to angular velocity, additional operational parameters can be used by the delay compensation unit for predicting the reaction of the sensor unit to the issued sensor moving command. These parameters include, for example, current operational mode of sensor, FOV size and line of sight (LOS) angular report. Information with respect to these parameters can be obtained from the sensing unit.

For instance, a command to move the sensor characterized by a given angular velocity would elicit a wider movement angle in cases where the FOV is wider, than in cases where the same command is issued with a narrower FOV. Also, a command issued in different elevation angles (LOS angular report) of the sensor has a different effect on the resulting sensor azimuth. Therefore, the elevation angle parameters are also considered.

Figure 5A:
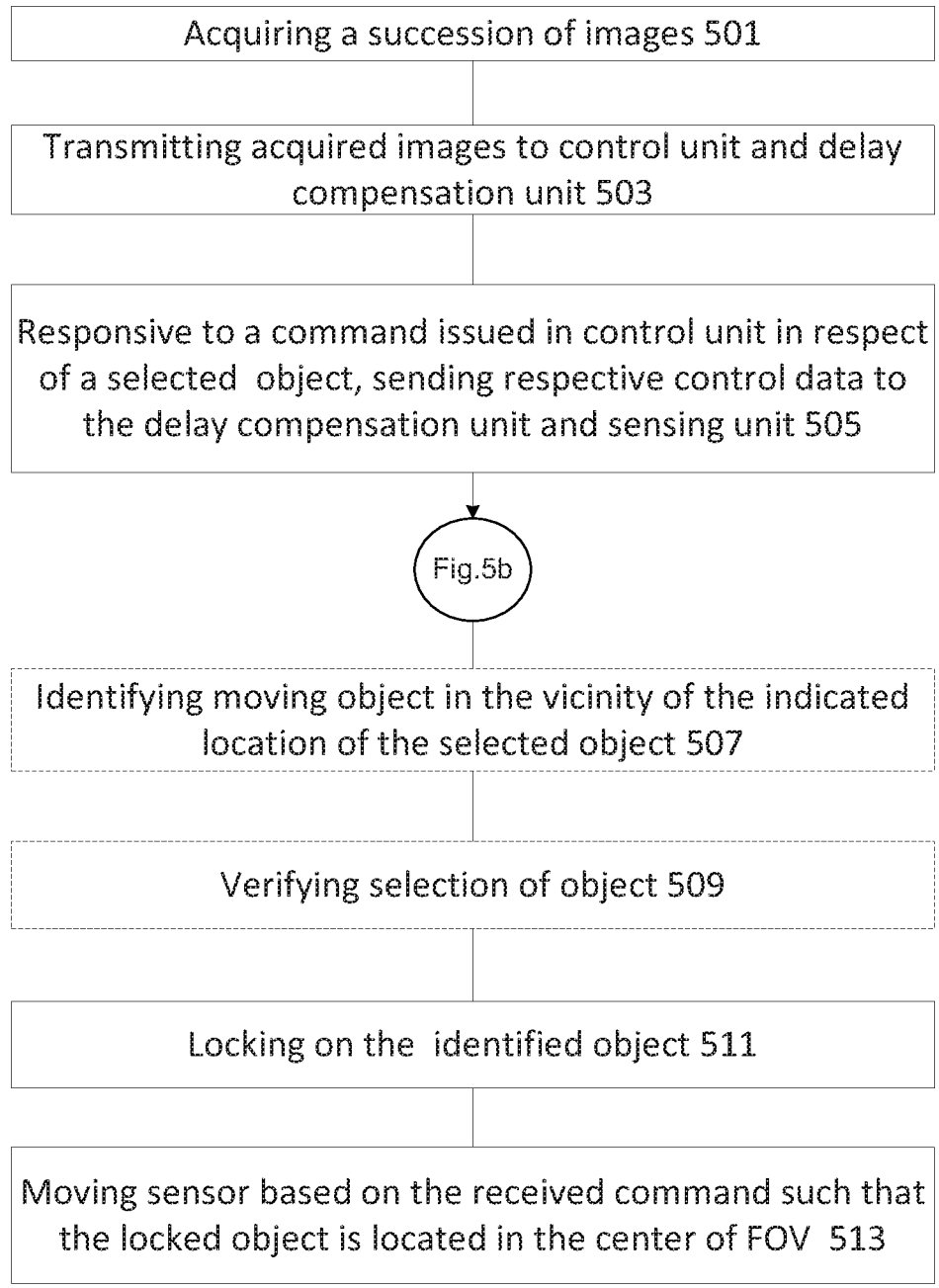
FIGS. 5a and 5b are flowcharts illustrating operations performed responsive to a lock command, in accordance with the presently disclosed subject matter.
Figure 5B:
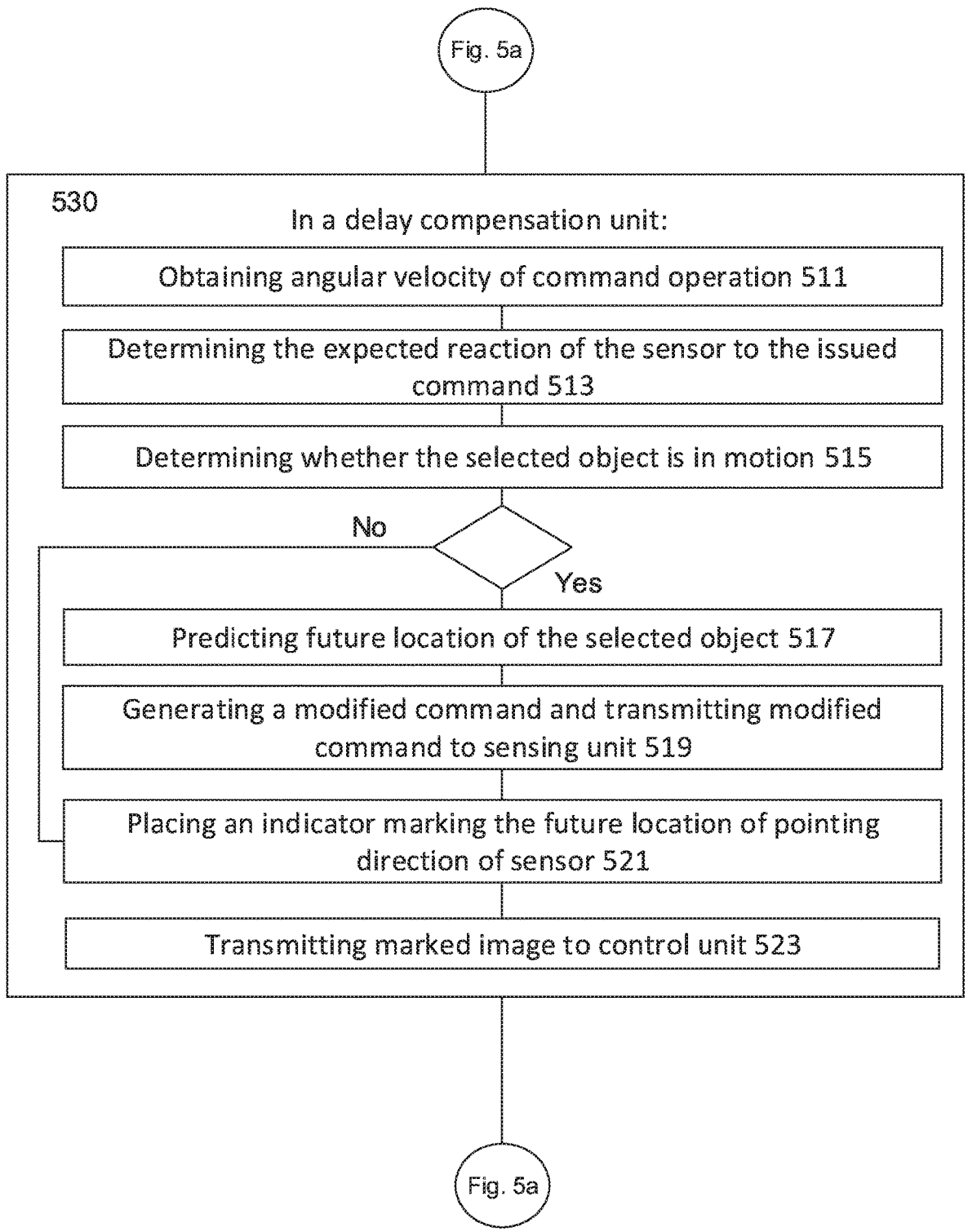

As explained above, an additional challenge of the electro optic observation system is to lock onto a selected moving object which may change its position by the time a command with respect to that object is processed and executed in the sensing unit. FIGS. 5a and 5b are flowcharts illustrating operations performed by system 100 for locking onto a selected object, in accordance with the presently disclosed subject matter. Operations described with reference to FIG. 5b with respect to block 530 can be executed for example with the help of lock command prediction module 210 in delay compensation unit 130.

As explained above with reference to FIG. 4, images of the surveyed scene are captured by a sensor operating in the sensing unit (block 501) and are sent to delay compensation unit and control unit (block 503).

Responsive to a lock command issued in the control unit with respect to a selected object, respective control data is sent to the delay compensation unit and to sensing unit (block 505). A track command includes instructions for directing the sensor module to locate the selected object, lock the sensor on the selected object, and track the object. A lock command usually starts with one or more sensor moving commands directed for pointing the sensor towards the object of interest to lock onto and possibly track.

The control data which is sent to delay compensation unit includes data indicative of the type of command which was issued, as well as information indicative of the angular velocity of the command operation.

Proceeding to FIG. 5b, as disclosed above, the delay compensation unit is configured, responsive to receiving the control data, to obtain information indicative of the angular velocity of the respective lock command from the control data, and use this information, together with the transfer function of the sensor module, in order to determine the expected reaction of the sensor module 119 to the issued command (blocks 511 and 513).

In addition, the delay compensation unit is configured to determine whether the selected object is moving or stationary (block 515). This can be accomplished for example, based on the dynamics of one or more received commands generated during the obtaining process of the object of interest. When an operator is attempting to obtain (select) a moving object, the target obtaining process is characterized by different dynamics than the selection operation of a stationary object. Since the object of interest is on the move, the operator is required to use a control device (e.g. joystick) to follow the object and adjust the control device until the object of interest is captured and selected in the desired manner. The delay compensation unit is configured to determine, based on the dynamics of the obtaining process, whether the selected object is in motion or stationary.

In case it is determined that the selected object is stationary, the process continues to block 521. In case it is determined that the selected object is a moving object, the delay compensation unit is configured to determine a predicted location of the selected object at the time the issued command is executed at the sensing unit (block 517). This predication is based, inter alia, on the velocity of the selected object, the direction of the selected object, and information with respect to the movement of the sensing unit and/or sensor with respect to the scene, which is received from the sensing unit.

Once the predicted location of a moving object is determined, a modified command is generated in the delay compensation unit comprising modified instructions. The modified instructions direct the sensing unit to the predicted real-time location of the selected object of interest, rather than the original location in which the object was initially selected by the operator. The modified command is transmitted from the delay compensation unit to the sensing unit (block 519).

The delay compensation unit is further configured to place an indicator (e.g. cross or tracking window indicator) in the latest available captured image of the scene, marking the future location to which the sensor is about to point after it is moved towards the selected object (block 521).

The marked image is transmitted to the control unit where it is displayed on the display screen, thereby providing the operator with feedback indicative of the result of the issued command (block 523). The feedback is provided to the operator practically without delay (or with insignificant delay), and before the command is executed at the sensing unit.

Reverting to FIG. 5a, at the sensing unit, in response to the received lock command, the command is processed and executed, and the senor locks on and tracks the selected object in accordance with instructions generated based on the command (block 511). In some cases, following the lock command, the sensor is moved such that the locked object is located at the center of FOV (block 513).

Optionally, in order to reduce the risk of a failure to detect a moving object by the sensing unit, it can further comprise a VMD module implementing a VMD algorithm. Once the modified command is received, the sensing unit is configured to open a window covering an area of a predefined size around the predicted location of the selected object, as indicated in the modified command. The sensing unit activates the VMD algorithm to identify moving objects in the area within the window (block 507). In case the VMD identifies moving objects within the window, the sensing unit can designate these objects as being candidate objects for the selected object. Sensing unit can use information obtained by the VMD module in order to validate the locking instructions provided in the received command (block 509). For example, in case the selected object is not located at the predicted location specified in the command, and the VMD module identifies a nearby moving object within the window, the sensing unit can determine that this is the sought after object of interest and lock onto that object (or request from the operator a confirmation to lock onto the object). In another example, in case more than one moving object is identified within the selected area, sensing unit can select the moving objects characterized by similar dynamics (e.g. velocity and direction) to the dynamics of the selected object as determined by the delay compensation unit. Alternatively or additionally, when more than one moving object is detected, sensing unit can send a query to the operator requesting the operator to indicate which of the moving objects is the sought after object.

Thus, the electro optic observation system and method disclosed herein enable to execute a lock command issued with respect to a selected object notwithstanding a time-delay between the time when the sensing unit acquires the image with the selected object, to a time when a corresponding command is received at the sensing unit with respect to the selected object.

In addition to the above, the presently disclosed subject matter enables to remedy the problems resulting from the time delay discussed above, which arise in the execution of other types of commands.

Figure 6:
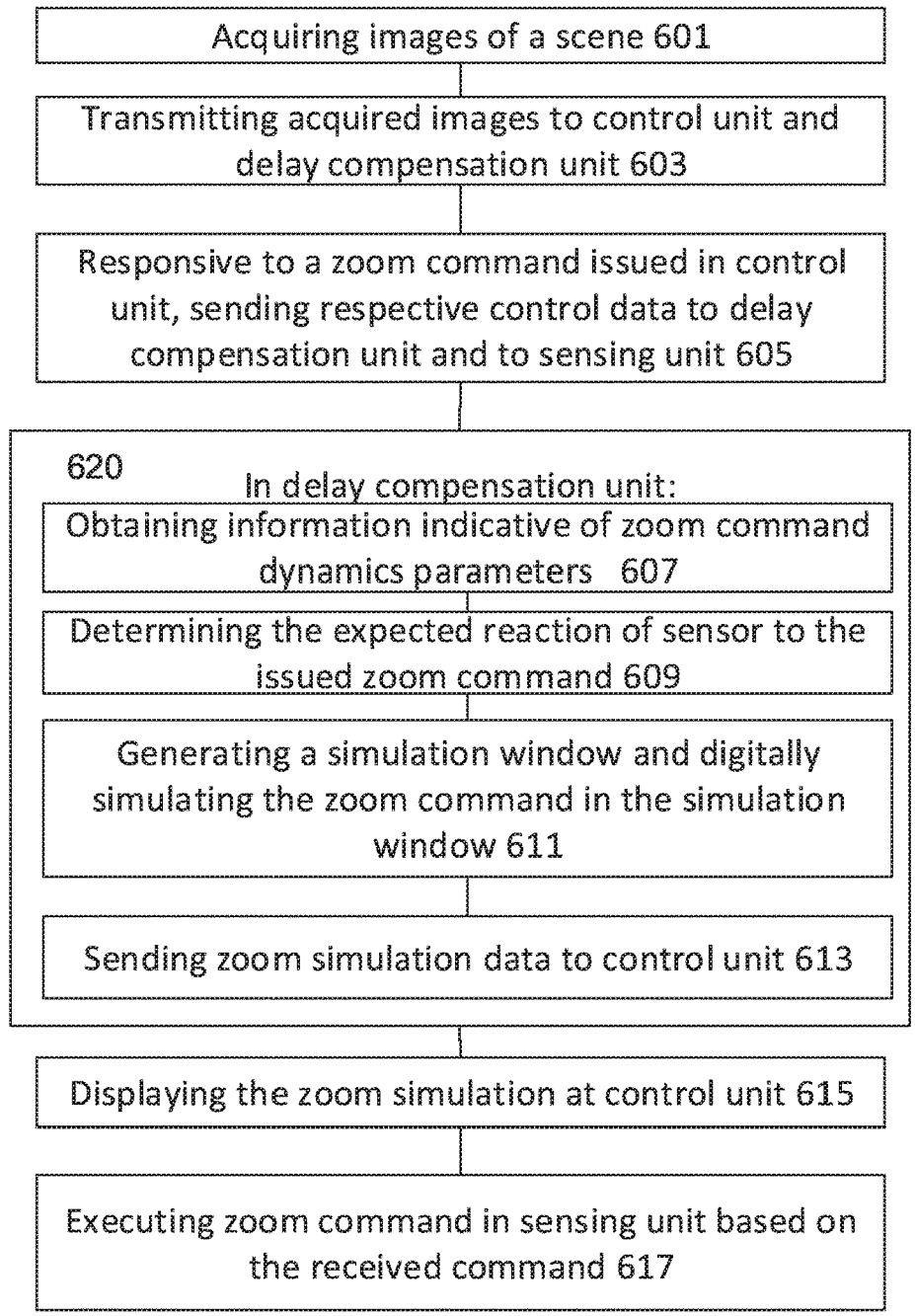
FIG. 6 is a flowchart illustrating operations performed responsive to a zoom command, in accordance with the presently disclosed subject matter.

FIG. 6 is a flowchart illustrating operations performed in response to a zoom command, in accordance with the presently disclosed subject matter. Operations described with reference to FIG. 6 can be executed by electro optic observation system 100 described herein. Operations described with reference to FIG. 6 with respect to block 620 can be executed for example with the help of zoom command prediction module 205 in delay compensation unit 130.

As explained above, images of a monitored scene are captured by the sensor in the sensing unit and are transmitted to the delay compensation unit and to the control unit. At block 605 responsive to a zoom command issued in the control unit, control data is sent from the control unit to the delay compensation unit and the sensing unit. The control data which is sent to the delay compensation unit includes information indicative of parameters of the zoom command dynamics (block 607). This data includes for example information indicating whether it is a zoom-out or zoom-in command, and the extent of the zoom.

The delay compensation unit is configured to use the received information indicative of the dynamics of the zoom command together with the respective transfer function (which models the dynamics of the zoom mechanism in the sensor module) to determine the expected effect of the zoom command on the captured images (block 609).

Once the expected reaction of the sensing unit to the zoom command is obtained, the delay compensation unit generates a zoom simulation window in which a digital simulation of the zoom is displayed (block 611). To generate the simulation window, a piece of the image surrounding the object or area (e.g. a rectangle of a predefined size) in the image which was selected in the zoom command, is copied. The zoom simulation window is displayed on the display screen in the control center (block 613).

Based on the calculated reaction of the zoom command, the zoom command is simulated in the zoom simulation window, thereby providing the operator with a simulation of the zoom command, practically without delay (or with insignificant delay) from the time the command is issued.

If the operator is satisfied with the result of the zoom command, he can stop any further zooming. Otherwise, the operator can issue additional zoom commands in order to further adjust the zoom of the sensor.

In the meantime, the zoom command is processed and executed by the sensing unit. Once the zoom command is executed, the simulation window can be closed.

Figure 7:
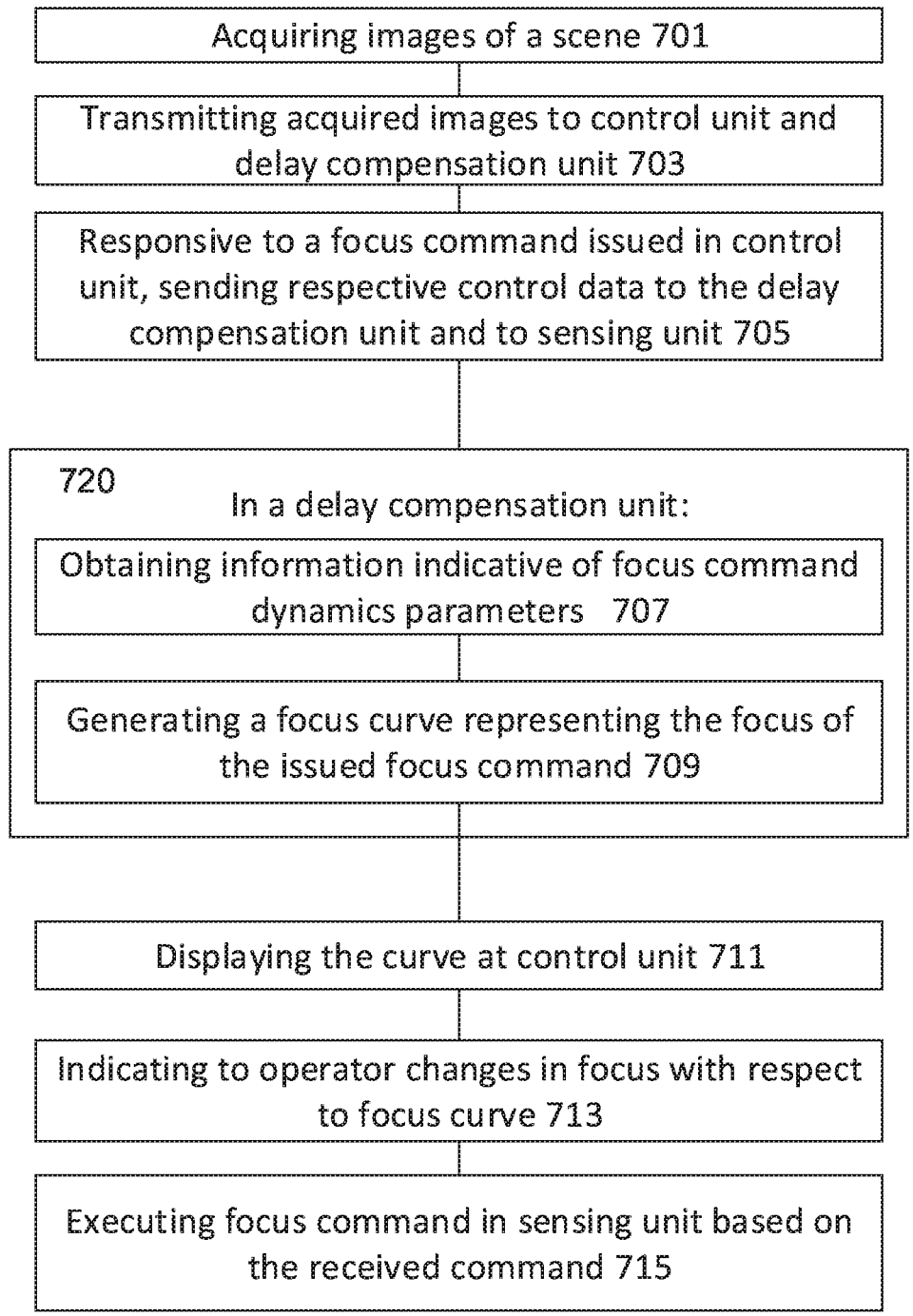
FIG. 7 is a flowchart illustrating operations performed responsive to a focus command, in accordance with the presently disclosed subject matter.

FIG. 7 is a flowchart illustrating operations performed in response to a focus command, in accordance with the presently disclosed subject matter. Operations described with reference to FIG. 7 can be performed by system 100 disclosed herein. More specifically, operations described with reference to FIG. 7 with respect to block 720 can be executed for example with the help of focus command prediction module 207 in delay compensation unit 130.

As disclosed earlier, images of a monitored scene are captured by a sensor in sensing unit and transmitted to delay compensation unit and to the control unit. At block 705 responsive to a focus command issued in the control unit, control data is sent from the control unit to the sensing unit and to the delay compensation unit.

The control data which is sent to the delay compensation unit includes information indicative of parameters of the focus command dynamics (block 707). This data can include information indicating whether it is a far focus or a near focus, and the extent of the focus.

In general, a focus of a sensor in given scene environmental conditions (e.g. distance of sensor from object, light conditions etc.) can be represented by a Gaussian curve, where the peak of the curve indicates the optimal focus.

According to the presently disclosed subject matter, the delay compensation unit is configured to use the received information indicative of the focus command in order to generate, with the help of the respective transfer function (which models the dynamics of the focus mechanism in the sensor module), a Gaussian curve (herein "focus curve") representing the focus of the issued focus command (block 709).

In general, a focus is adjusted by one or more commands which are issued until a desired focus is obtained. When a focus command is initiated, the delay compensation unit is configured to obtain the information with respect to the command dynamics parameters from the initial focus commands, and generate the respective curve based on this information immediately after the operator commences the focus command. Information with respect to the focus curve is sent to the control unit and displayed on a display screen (block 711). As the operator proceeds to change the focus of the senor by issuing additional commands, the commands are processed by the delay compensation unit and changes in the focus are shown on the focus curve which is displayed to the operator (block 713). Thus an operator is provided with feedback indicating the reaction to issued focus commands, practically without delay (or with insignificant delay), before the respective command is executed by the sensing unit. By following the progress of the focus indication which is displayed on the focus curve, the operator is able to see when the issued focus commands provide the optimal focal point, and adjust the focus accordingly.

In the meantime, the focus command is processed and executed by the sensing unit. Once the focus command is executed, the focus graph can be removed from the display screen.

It will also be understood that the system according to the presently disclosed subject matter may be a suitably programmed computer. Likewise, the presently disclosed subject matter contemplates a computer program being readable by a computer for executing the method of the presently disclosed subject matter. The presently disclosed subject matter further contemplates a machine-readable memory tangibly embodying a program of instructions executable by the machine for executing the method of the presently disclosed subject matter.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

The invention claimed is:

1. A delay compensation unit:
the delay compensation unit is operatively connectable to a control unit; the control unit is configured to communicate over a communication link with a sensing unit, wherein a delay in communication between the control unit and the delay compensation unit is smaller than a delay in communication between the control unit and the sensing unit;
the sensing unit comprises a sensor module configured to: capture a plurality images of a scene, and transmit a succession of images to the control unit;
the delay compensation unit comprises at least one computer processor configured, responsive to a command issued in the control unit with respect to the succession of images, to:
obtain from the control unit information indicative of command dynamics parameters, characterizing the command issued at the control unit;
determine, based on the information and a respective transfer function which models the dynamics of the sensor module, an expected reaction of the sensing module to the command; and
provide data to the control unit for presentation of the expected reaction of the sensing unit to the command before the command is executed at the sensing unit;
wherein the command includes one or more of the following commands:
i. a sensor-movement command, directed for pointing the sensor in a desired direction;
ii. a zoom command; and
iii. a focus command;
in case the command is a sensor-movement command the delay compensation unit is configured to:
determine, based on information indicative of the command dynamics parameters and the respective transfer function, a future location of the desired pointing direction of the sensor in a captured image following the execution of the command; provide an indication to the control unit indicating the future location before the command is executed at the sensing unit;
in case the command is a zoom command;
the delay compensation unit is configured to:
determine, based on the information indicative of the command dynamics parameters and the respective transfer function, the effect of the zoom command on the two or more captured images;
generate a digital simulation of the effect of the zoom command;
provide the control unit with digital simulation before the command is executed in the sensing unit; and
in case the command is a focus command;
the delay compensation unit is configured to:
generate, based on the information indicative of the command dynamics parameters and the respective transfer function which models the dynamics of the sensor module, a focus curve indicative of the optimal focus of the sensor; provide the control unit with data indicative of said focus curve; indicate a position of a current focus with respect to the focus curve before the focus command is executed in the sensing unit, thereby providing the control unit with information indicative of the optimal focus.

2. The delay compensation unit according to claim 1 wherein the data indicative of the command dynamics parameters include data indicative of the angular velocity of a respective command operation.

3. An electro optic system, comprising:
a sensing unit comprising a sensor module, the sensing unit configured to communicate over a communication link with a control unit, to capture two or more images of a scene and to generate a succession of images and transmit the succession of images to the control unit;
a delay compensation unit operatively connected to the control unit, wherein a delay in communication between the control unit and the delay compensation unit is smaller than a delay in communication between the control unit and the sensing unit;
the delay compensation unit comprises at least one computer processor configured, responsive to a command issued in the control unit with respect to the succession of images, to:
obtain from the control unit information indicative of command dynamics parameters, characterizing the command issued at the control unit; determine, based on the information and a respective transfer function which models the dynamics of the sensor module, an expected reaction of the sensing module to the command; and provide data to the control unit for presentation of the expected reaction of the sensing unit to the command before the command is executed in the sensing unit;
wherein said command includes one or more of the following commands:
i. a sensor-movement command, directed for pointing the sensor in a desired direction;
ii. a zoom command;
iii. a focus command;
in case the command is sensor-movement command the delay compensation unit is configured to:
determine, based on information indicative of the command dynamics parameters and the respective transfer function, a future location of the desired pointing direction of the sensor in a captured image, following the execution of the command; provide an indication to the control unit indicating the future location before the command is executed in the sensing unit;
in case the command is a zoom command, the delay compensation unit is configured to:
determine, based on the information indicative of the command dynamics parameters and the respective transfer function, the effect of the zoom command on the two or more captured images;
generate a digital simulation of the effect of the zoom command;
provide the control unit with digital simulation before the command is executed in the sensing unit; and
in case the command is a focus command, the delay compensation unit is configured to:
generate, based on the information indicative of the command dynamics parameters and the respective transfer function which models the dynamics of the sensor module, a focus curve indicative of the optimal focus of the sensor; provide the control unit with data indicative of said focus curve; indicate a position of a current focus with respect to the focus curve before the focus command is executed in the sensing unit, thereby providing the control unit with information indicative of the optimal focus.

4. The system according to claim 3 wherein the information indicative of the command dynamics parameters includes data indicative of the angular velocity of a respective command operation.

5. The system according to claim 3 wherein said sensing unit is located in any one of a list including:
an airborne vehicle; a ground vehicle; a marine vehicle; or a missile; and
wherein said control unit and said delay compensation unit are located in another remote location.

6. The system according to claim 3 wherein the command is a command issued with respect to a selected object of interest in the scene and wherein the sensing unit further comprises a video motion detection (VMD) module; the sensing unit is configured to activate the VMD module to identify moving objects in a predefined area; in case the VMD module identifies moving objects within the predefined area, the moving objects are designated as candidate objects for being the selected object.

7. A method of compensating a delay in communication between a sensing unit and a control unit, where a delay in communication between the control unit and a delay compensation unit is smaller than a delay in communication between the control unit and the sensing unit; the method comprising:
using a computer processor in the delay compensation unit for performing at least the following:
receiving from said sensing unit a succession of two or more captured images captured by a sensor module located at the sensing unit;
obtaining from the control unit information indicative of command dynamics parameters, characterizing a command issued at the control unit for controlling the sensor module;
determining, based on the information and a respective transfer function which models the dynamics of a sensor module, an expected reaction of the sensor module to the command; and
provide data to the control unit for presentation of the expected reaction of the sensing unit to the command before the command is executed in the sensing unit;
wherein said command includes one or more of the following commands:
i. a sensor-movement command;
ii. a zoom command;
iii. a focus command;
wherein in case the command is a sensor-movement command the method further comprising:
determining, based on the information indicative of the command dynamics parameters and the respective transfer function, a future location of a center of field of view of the sensor module following the execution of the command; and
providing data to the control unit for presentation the future location of the center of field of view before the command is executed in the sensing unit;
in case the command is a zoom command, the method further comprising:
determining, based on the information indicative of the command dynamics parameters and the respective transfer function, the effect of the zoom command on the captured images;
generating a digital simulation of the effect of the zoom command; and
providing the control unit with digital simulation before the command is executed in the sensing unit; and in case the command is a focus command, the method further comprising:
generating, based on the information indicative of the command dynamics parameters and the respective transfer function, a focus curve indicative of the optimal focus of the sensor;
providing the control unit with data indicative of said focus curve; and
indicating a position of a current focus with respect to the focus curve before the focus command is executed in the sensing unit, thereby providing the control unit with information indicative of the optimal focus.

8. The method according to claim 7, wherein the command dynamics parameters include data indicative of the angular velocity of a respective command operation.

9. The method according to claim 7 wherein said providing data to the control unit for presentation of the future location of the center of field of view further comprises: placing an indicator in the latest available image of a surveyed scene at a future location in the center of the field.

10. The method according to claim 7 wherein said determining of the future location of the center of field of view following the execution of the command is based also on a time delay between the sensing unit and control unit.

11. A non-transitory computer storage device readable by a computer device, tangibly embodying a program of instructions executable by the computer device to perform a method of compensating a delay in communication between a sensing unit and a control unit, the method comprising:
receiving from said sensing unit a succession of two or more captured images; obtaining from the control unit information indicative of command dynamics parameters, characterizing a command issued at the control unit for controlling a sensor module in the sensing unit;
determining, based on the information and a respective transfer function which models the dynamics of the sensor module, an expected reaction of the sensor module to the command; and
providing data to the control unit for presentation of the expected reaction of the sensing unit to the command before the command is executed in the sensing unit;
wherein said command includes one or more of the following commands:
i a sensor-movement command;
ii a zoom command:
iii a focus command;
wherein in case the command is a sensor-movement command the method further comprising:
determining, based on the information indicative of the command dynamics
parameters and the respective transfer function, a future location of a center of field of view of the sensor module following the execution of the command; and
providing data to the control unit for presentation the future location of the center of field of view before the command is executed in the sensing unit;
in case the command is a zoom command, the method further comprising:
determining, based on the information indicative of the command dynamics
parameters and the respective transfer function, the effect of the zoom command on the captured images;
generating a digital simulation of the effect of the zoom command; and
providing the control unit with digital simulation before the command is executed in the sensing unit; and in case the command is a focus command, the method further comprising: generating, based on the information indicative of the command dynamics parameters and the respective transfer function, a focus curve indicative of the optimal focus of the sensor;
providing the control unit with data indicative of said focus curve; and indicating a position of a current focus with respect to the focus curve before the focus command is executed in the sensing unit, thereby providing the control unit with information indicative of the optimal focus.

12. A delay compensation unit:
the delay compensation unit is operatively connectable to a control unit; the control unit is configured to communicate over a communication link with a sensing unit, wherein a delay in communication between the control unit and the delay compensation unit is smaller than a delay in communication between the control unit and the sensing unit;
the sensing unit comprises a sensor module configured to:
capture two or more images of a scene, generate a succession of images and transmit the succession of images to the control unit;
the delay compensation unit comprises at least one computer processor configured, responsive to a command issued at the control unit with respect to the succession of images, to:
obtain from the control unit information indicative of command dynamics parameters, characterizing the command issued at the control unit;
determine, based on the information and a respective transfer function which models the dynamics of the sensor module, an expected reaction of the sensing module to the command; and
provide data to the control unit for presentation of the expected reaction of the sensing unit to the command before the command is executed at the sensing unit;
wherein the command is a lock command, directed for locking the sensor on a selected object of interest in the scene,
the delay compensation unit is configured in case said object of interest is moving, to:
determine future location of said object at the time the command is executed in said sensing unit; modify the lock command to include the future location; and transmit the modified lock command to the sensing unit thereby providing the sensing unit with information indicative of predicted real-time location of the selected object.

13. The delay compensation unit according to claim 12 further configured to execute said lock command with respect to the selected object notwithstanding a time-delay between a time when the sensing unit acquires the image with the selected object, to a time when a corresponding command is received at the sensing unit with respect to the selected object.

14. A method of compensating a delay in communication between a sensing unit and a control unit, where a delay in communication between the control unit and a delay compensation unit is smaller than a delay in communication between the control unit and the sensing unit; the method comprising:
using a computer processor in the delay compensation unit for performing at least the following:
receiving from said sensing unit a succession of two or more captured images captured by a sensor module located at the sensing unit;
obtaining from the control unit information indicative of command dynamics parameters, characterizing a command issued at the control unit for controlling the sensor module;
determining, based on the information and a respective transfer function which models the dynamics of a sensor module, an expected reaction of the sensor module to the command; and
provide data to the control unit for presentation of the expected reaction of the sensing unit to the command before the command is executed in the sensing unit;
wherein the command is a lock command directed for locking the sensor onto a selected object of interest in a surveyed scene; in case the object of interest is moving, the method further comprising:
determining future location of said object at the time the command is executed in said sensing unit;
modifying the lock command to include the future location, in case said object of interest is moving; and
transmitting the modified lock command to the sensing unit, thereby providing the sensing unit with information indicative of predicted real-time location of the selected object.

15. The method according to claim 14, wherein the command dynamics parameters include data indicative of the angular velocity of a respective command operation.

16. A non-transitory computer storage device readable by a computer device, tangibly embodying a program of instructions executable by the computer device to perform a method of compensating a delay in communication between a sensing unit and a control unit, the method comprising:
receiving from said sensing unit a succession of two or more captured images;
obtaining from the control unit information indicative of command dynamics parameters, characterizing a command issued at the control unit for controlling a sensor module in the sensing unit;
determining, based on the information and a respective transfer function which models the dynamics of the sensor module, an expected reaction of the sensor module to the command; and
providing data to the control unit for presentation of the expected reaction of the sensing unit to the command before the command is executed in the sensing unit;
wherein the command is a lock command directed for locking the sensor onto a selected object of interest in a surveyed scene and wherein the command dynamics parameters include data indicative of the angular velocity of a respective command operation; in case the object of interest is moving, the method further comprising:
determining future location of said object at the time the command is executed in said sensing unit;
modifying the lock command to include the future location, in case said object of interest is moving; and
transmitting the modified lock command to the sensing unit, thereby providing the sensing unit with information indicative of predicted real-time location of the selected object.

17. An electro optic system, comprising:
a sensing unit comprising a sensor module, the sensing unit configured to communicate over a communication link with a control unit, to capture two or more images of a scene and to generate a succession of images and transmit the succession of images to the control unit;
a delay compensation unit operatively connected to the control unit, wherein a delay in communication between the control unit and the delay compensation unit is smaller than a delay in communication between the control unit and the sensing unit;

the delay compensation unit comprises at least one computer processor configured, responsive to a command issued in the control unit with respect to the succession of images, to:

obtain from the control unit information indicative of command dynamics parameters, characterizing the command issued at the control unit; determine, based on the information and a respective transfer function which models the dynamics of the sensor module, an expected reaction of the sensing module to the command; and provide data to the control unit for presentation of the expected reaction of the sensing unit to the command before the command is executed in the sensing unit;

wherein the command is a lock command, directed for locking the sensor on a selected object of interest in the scene, the system is configured in case said object of interest is moving, to:

determine future location of said object at the time the command is executed in said sensing unit; to modify the lock command to include the future location; and transmit the modified lock command to the sensing unit thereby providing the sensing unit with information indicative of predicted real-time location of the selected object.

18. The system according to claim 17 wherein said sensing unit is configured, responsive to a lock command received from delay compensation unit: to search for moving objects in a predefined area surrounding the predicted real-time location of the selected object in order to ensure that the correct moving object is selected.

* * * * *